May 28, 1929.  D. I. REITER  1,715,044
FASTENING DEVICE
Filed Aug. 2, 1927  2 Sheets-Sheet 1
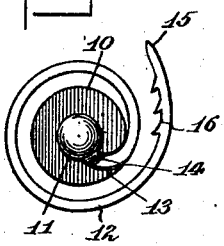
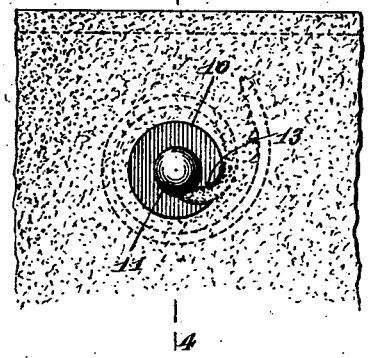
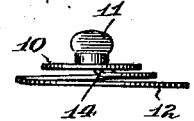
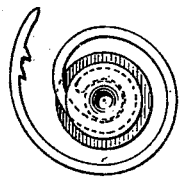
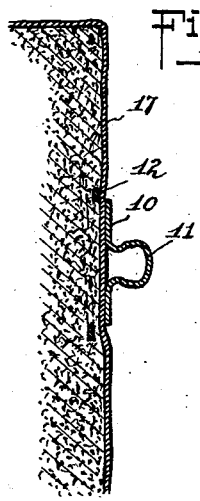
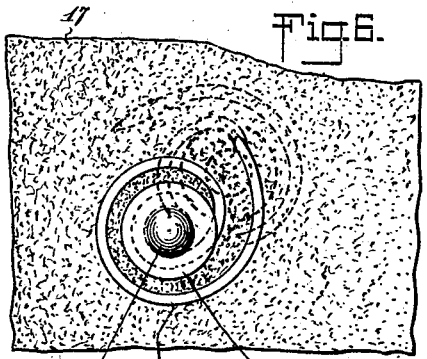
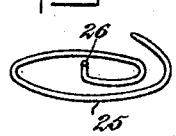
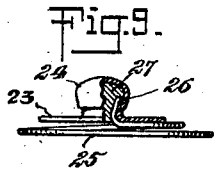
INVENTOR
Daniel I. Reiter
BY
ATTORNEY May 28, 1929.   D. I. REITER   1,715,044
FASTENING DEVICE
Filed Aug. 2, 1927   2 Sheets-Sheet 2
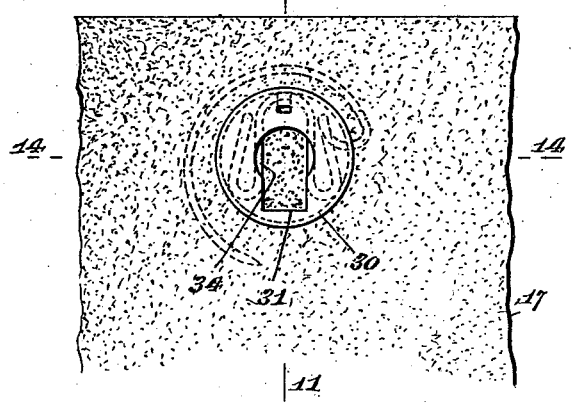
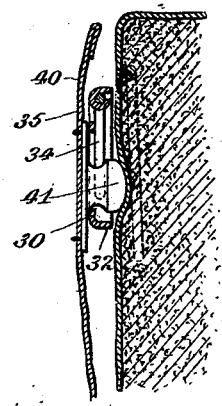
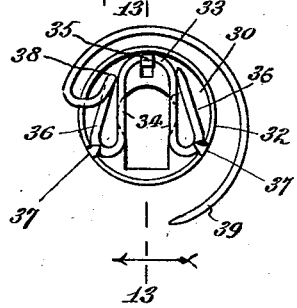
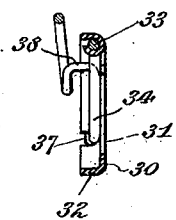
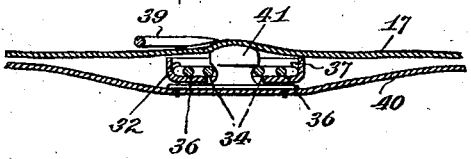
WITNESSES
William P. Goebel.
Franklin J. Foster
INVENTOR
Daniel I. Reiter.
BY Munn&Co.
ATTORNEY Patented May 28, 1929.

1,715,044

UNITED STATES PATENT OFFICE.

DANIEL I. REITER, OF NEW YORK, N. Y.

FASTENING DEVICE.

Application filed August 2, 1927. Serial No. 210,179.

The present invention is concerned with the provision of a fastening device preferably in the nature of a separable fastener element which may have a wide range of utility, but which finds one of its preferred embodiments in a fastener for securing dust covers to automobile upholstery.

The invention is concerned primarily with the provision of a fastening device adapted to serve the same purpose as the fasteners disclosed in my prior re-issued Patent No. 16,660, dated June 21, 1927.

An object of the invention is to provide a fastener which may be directly attached to the velour or other upholstering material without seriously damaging or scarring the upholstery; specifically, to provide a fastener in which simply one small opening is made in the upholstery by a penetrating point. Although specifically disclosed as applied to either the stud element or the socket element of a separable fastener it is intended to be generally applicable to any fastening device of disk-like form.

More specifically, an object of the invention is to provide a fastener in which a retaining pin of general spiral formation carries the fastener proper, and the fastener is applied by passing the pin through the upholstery and then twisting the device until substantially the full length of the pin lies behind the upholstery while the fastener proper lies on the outside thereof. By virtue of this arrangement, if the pin spirals in approximately to the center of the stud or other fastener element, the final position of the fastener may be readily gauged by simply predetermining the point at which the pin is inserted through the velour.

Another object of the invention is to provide a fastener element in which a keyhole slot action is utilized; this type of fastener being especially adapted for securing dust covers to the backs of automobile seats. Dust covers in this location are rapidly disconnected from ordinary fastening means, since a passenger leaning against the cover tends to pull it down and imposes a great strain which effects disconnection of the mating fastening elements on the covers and seat backs. By virtue of the construction of the present invention however, I combine the advantageous features of both a snap fastener and a keyhole slot fastener. Deliberate connection or disconnection of the mating fastening elements may be rapidly had by simply passing the male member of the fastener through a slot in the plate portion of a female fastener, in which position the male member is embraced and retained against direct withdrawal by spring arms located behind the slotted plate. A strain on the fastener elements such as that above described which would tend to slide one fastener relatively to the other causes the male member of the fastener to move down into a reduced portion of the slot in the plate where it is positively and mechanically held against retraction.

Other and more general objects of the invention are to provide a fastener of simple, practical construction, which will be rugged, durable and efficient in use, neat and attractive in appearance, capable of ready connection and disconnection to an associated fastening element and of ready application to the upholstery of a car.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a top plan view of a male fastener element embodying the present invention.

Fig. 2 is a similar view showing the fastener attached to a cushion such as the seat back of a car.

Fig. 3 is an edge view of Fig. 1.

Fig. 4 is a vertical sectional view on the line 4—4 of Fig. 2.

Fig. 5 is a bottom plan view of a modified form of fastener.

Fig. 6 is a plan view of the fastener of Fig. 5 showing the device in position to be attached to a cushion, and the dotted lines indicating the position of the fastener after it has been applied.

Fig. 7 is a transverse sectional view through the fastener of Fig. 6.

Fig. 8 is a perspective view of a length of wire used in connection with a further modified type of fastener such as that shown in Fig. 9.

Fig. 9 is a view partly in side elevation and partly in section showing a further modified type of fastener.

Fig. 10 is a plan view of a female fastener element constructed in accordance with the invention.

Fig. 11 is a vertical sectional view therethrough on the line 11—11 of Fig. 10.

Fig. 12 is a view in rear elevation of the fastener of Fig. 10.

Fig. 13 is a sectional view on the line 13—13 of Fig. 12.

Fig. 14 is a sectional view through the female element of the fastener showing the latter applied to a backing sheet and operatively engaged with a male fastener element.

Referring first to Figs. 1 to 4 of the drawings I have shown a male fastener element adapted to be secured to the upholstered seat or back of an automobile, and to serve as an anchorage for a dust cover carrying a female element, neither the cover nor the female element being shown.

The fastener illustrated in Figs. 1 to 4 is preferably stamped from a single piece of material such as thin metal sheet stock. It includes a plate or disk like portion such as 10 carrying a separable fastener element such as the hollow headed stud 11 in its center. Integral with the plate 10 is a pin portion 12 comprising a thin flat metallic strip of general convolute formation. The inner end of the strip is preferably formed by slitting the plate 10 as at 13, and the inner end of the pin or strip 12 is set downwardly from the body of the plate to form an offset portion as best seen at 14 in Fig. 3. From the plate edge, the pin 12 curves outwardly in a convolute path, which convolute form may be carried to any desired length. As a matter of fact, in some instances the pin 12 might be only partially convolute, or it might describe a number of convolutions. If desired, the pin 12 near its extreme pointed end 15 may be formed with rearwardly turned spur teeth on one edge for a purpose to be more fully hereinafter described.

In use, the person applying the fastener decides approximately the location which the stud member 11 should assume on the cushion or seat back 17, and enters the pointed end of the pin through the cushion at this point. The stud 11 is then grasped and manually twisted until the entire length of the pin 12 has been passed through the entering opening and the pin lies entirely under the cushion cover. At this time, inasmuch as the convolute pin at its anchored end is approximately at the center of the plate 10, the stud 11 will be disposed very close to the opening through which the pin was inserted. While Fig. 6 shows a slightly different form of fastener, the action of screwing the device home is well illustrated, the full lines showing the fastener just before the pointed end of the pin is inserted, and the dotted lines showing the position assumed by the fastener after it has been screwed home. It will be noted in Fig. 6 that the stud member lies very close to the point at which the pin entered the velour.

With the device in place, the plate 10 lies on one side of the velour and the convolute pin 12 in concealed position on the opposite side thereof, so that it is quite impossible to detach the fastener by exerting a direct pull thereon in any direction. Obviously, the fastener must be removed by subjecting it to a reverse screwing action, and such reverse action is one which could never occur accidentally in the ordinary course of use of the fastener. The teeth 16 are provided if desired in order to block any accidental retrograde rotation of the fastener element.

In Figs. 5 to 7 I have illustrated a slight modification in which a three-piece fastener is used. A metal plate or disk-like portion 18 is formed with an integral hollow stud 19. A convolute pin 20 is retained in place by a clamping device 21 somewhat in the nature of an eyelet forced into the hollow stud 19 and including a flange 22 which cooperates with the plate 18 to grip and retain the inner end of the pin 20.

In Figs. 8 and 9 I have illustrated a further modification of male fastener member in which a plate 23 is formed integral with a hollow stud 24. The convolute pin 25 in this instance consists simply of a length of spring wire bent into the proper formation and having an upturned extension 26 at its inner end secured by soldering it at 27 into the hollow stud 24.

In Figs. 10 to 14 inclusive I have illustrated a female fastener element adapted to be anchored directly to the upholstery and embodying in addition to the spiral pin feature a unique type of keyhole slot arrangement.

In this form of the invention, the fastener includes a plate or disk-like portion 30 having a keyhole slot 31 therein and formed with a flanged marginal edge 32. A single length of spring wire is bent at 33 into substantially U-shape with its parallel stud-retaining elements 34 spaced apart and exposed through the larger end of the slot 31. The intermediate portion of the U 33 is anchored by turning over upon it a tongue 35 struck rearwardly from the plate 30. The two ends of the U 33 are then bent back upon themselves as at 36 and 36 and may be secured by tongues 37 struck inwardly from the flange 32, so that a three-point attachment is had for securing the wire firmly to the back of the plate. One of the reversely bent portions 36 of the wire is then rearwardly offset as at 38 and the pointed end of the wire bent into approximately convolute or partial convolute shape at 39 so that this fastener may be applied to the velour in the manner described in connection with the other forms of fasteners.

In the operation of this form of the device the fastener is applied to the cushion by inserting the pointed end of the pin in the cushion and twisting the fastener until it reaches its home position of Fig. 10 with the larger end of the keyhole slot uppermost. A dust cover such as 40 carrying a conventional stud member or other suitable member 41 may be conveniently anchored to the cushion by pushing the stud directly through the larger end of the keyhole slot; the stud head spreading the spring arms 34 and the arms snapping together again around the neck of the stud.

In the ordinary course of use, passengers leaning against the dust cover 40 will impose a substantial downward strain thereon tending to disconnect the stud 40 from the female element of the fastener. Any downward strain or downward pull on the seat cover however, simply serves to move the neck of the stud 41 into the smaller end of the keyhole slot, in which instance it is positively and mechanically locked against disconnection from the female member. There is thus gained the double advantage of the spring snap fastener action retaining the stud against accidental disconnection in case it slips up while the covers are being straightened or dusted, and the positive keyhole slot lock which holds the stud when strains are imposed on the dust cover.

Obviously with the form of invention shown in Fig. 10, one or both ends of the wire might be bent into straight single or double pin formation instead of into the special convolute form shown. In other words, the keyhole slot feature while capable of combination with the convolute pin feature is also capable of use with female pin fasteners not embodying the convolute pin arrangement.

Obviously various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. A fastening device comprising a disk-like portion adapted to make contact with one surface of the article on which the device is used, and a single convolute pin having a pointed outer end and an offset inner end extended from said disk-like portion at a distance from its periphery, said offset portion serving as a separator between the disk-like portion and the convolute portion of the pin whereby the whole length of the latter may be held in contact with the opposite surface of said article, the offset portion being of sufficient length to pass through the material of said article and connect the parts of the device lying at its opposite surfaces.

2. A fastening device comprising a disk-like snap fastener element adapted to make contact with one surface of the article on which it is used, a single convolute pin having a pointed outer end and an offset inner end extended from said element at a distance from its periphery, said offset portion being adapted to pass through the material of the article on which the device is used and serve as a separator between said element and the convolute portion of the pin whereby the whole length of the latter may be held in contact with the opposite surface of said article.

3. A snap fastener socket member comprising a disk-like element having a key-hole shaped slot therein, said element being adapted for application to one surface of the article on which it is to be used, a single convolute pin having a pointed outer end and an offset inner end extended from said element at a distance from its periphery, said offset portion being adapted to pass through the material of the article on which the member is used and serve as a separator between said element and the convolute portion of the pin whereby the whole length of the latter may be held in contact with the opposite surface of said article.

4. A snap fastener socket member comprising a disk-like portion having a key-hole shaped stud-receiving opening therein the larger end of which is adapted to receive, and the smaller end of which is adapted to retain, an inserted stud, and a single length of wire secured to said disk-like portion and including a pointed portion to serve as a pin and a resilient stud-retaining portion disposed back of and just within the margin of the larger end of said opening.

5. A separable fastener element including a plate having a keyhole slot therein and a pin for attaching the plate to a fabric, and spring means under the larger end of the slot for engaging a stud head inserted therethrough, said spring means being integral with the pin, and said pin being of general convolute form.

6. A snap fastener socket member comprising a disk-like element having a stud-receiving opening therein and a single piece of wire secured thereto, said wire having a sharp-ended portion bent to convolute form to serve as an attaching pin, spaced bent portions secured to said disk-like element, and portions intermediate said secured portions disposed behind and just within the margins of the stud-receiving opening of said disk-like element to serve as resilient stud-retaining elements.

7. A snap fastener socket member comprising a disk-like element having a stud-receiving opening therein and a single piece of wire secured thereto, said wire having a sharp-ended portion bent to convolute form to serve as an attaching pin and a resilient stud-retaining portion disposed behind and just within the margin of said stud-receiving opening.

Signed at New York city in the county of New York and State of New York this 30th day of July A. D. 1927.

DANIEL I. REITER.